United States Patent [19]

Shepherd

[11] Patent Number: 4,865,419
[45] Date of Patent: Sep. 12, 1989

[54] INSTRUMENT PANEL MAGNIFICATION SYSTEM

[76] Inventor: David M. Shepherd, 30178 Mayfair, Farmington Hills, Mich. 48331

[21] Appl. No.: 211,051

[22] Filed: Jun. 24, 1988

[51] Int. Cl.[4] .............................................. G02B 27/02
[52] U.S. Cl. .................................... 350/114; 350/452; 40/209
[58] Field of Search .................... 350/114, 284, 276 R, 350/451, 452, 319, 251, 252; 40/209

[56] References Cited

U.S. PATENT DOCUMENTS

| | | | |
|---|---|---|---|
| 3,389,486 | 6/1968 | Trammell, Jr. | 40/209 |
| 3,683,529 | 8/1972 | Reed | 40/209 |
| 3,797,917 | 3/1974 | Barbour | 350/452 |
| 4,493,535 | 1/1985 | Champeau | 350/452 |
| 4,589,739 | 5/1986 | Goodman | 350/452 |
| 4,695,135 | 9/1987 | Den Exter Blokland et al. | 350/452 |

Primary Examiner—Bruce Y. Arnold
Assistant Examiner—Loha Ben
Attorney, Agent, or Firm—Marvin S. Siskind; Richard M. Goldman

[57] ABSTRACT

A Fresnel lens operatively affixed proximate the transparent faceplate which covers the cluster of gauges disposed on an automotive instrument panel for magnifying the digital or analog information displayed by those gauges.

10 Claims, 1 Drawing Sheet

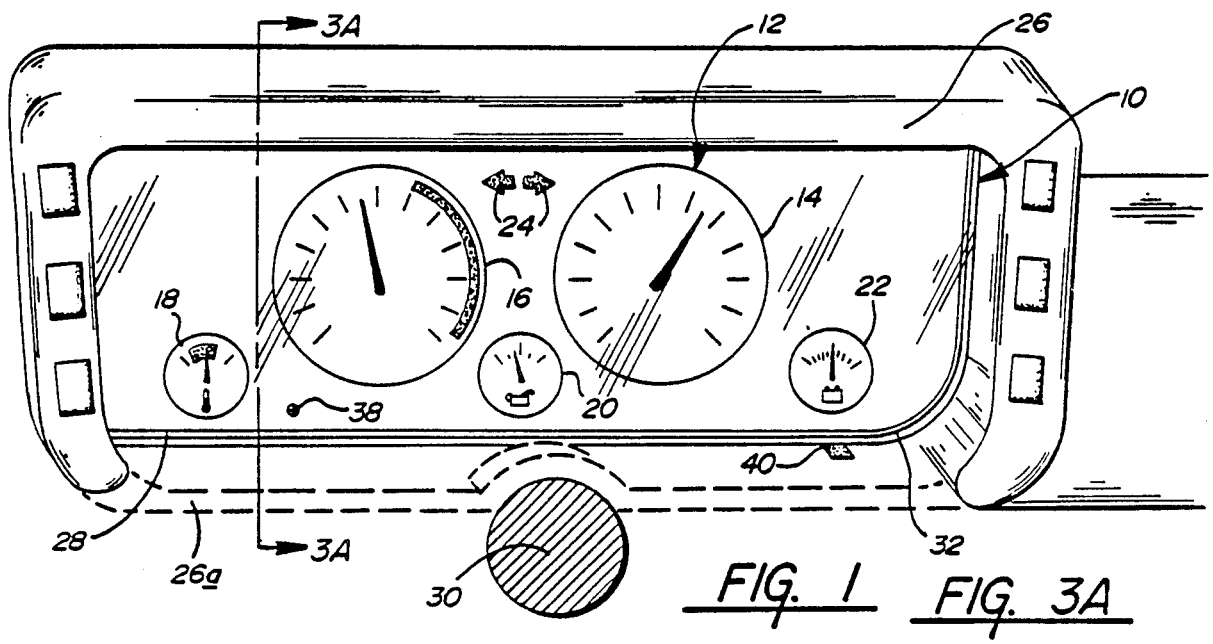
FIG. 1    FIG. 3A
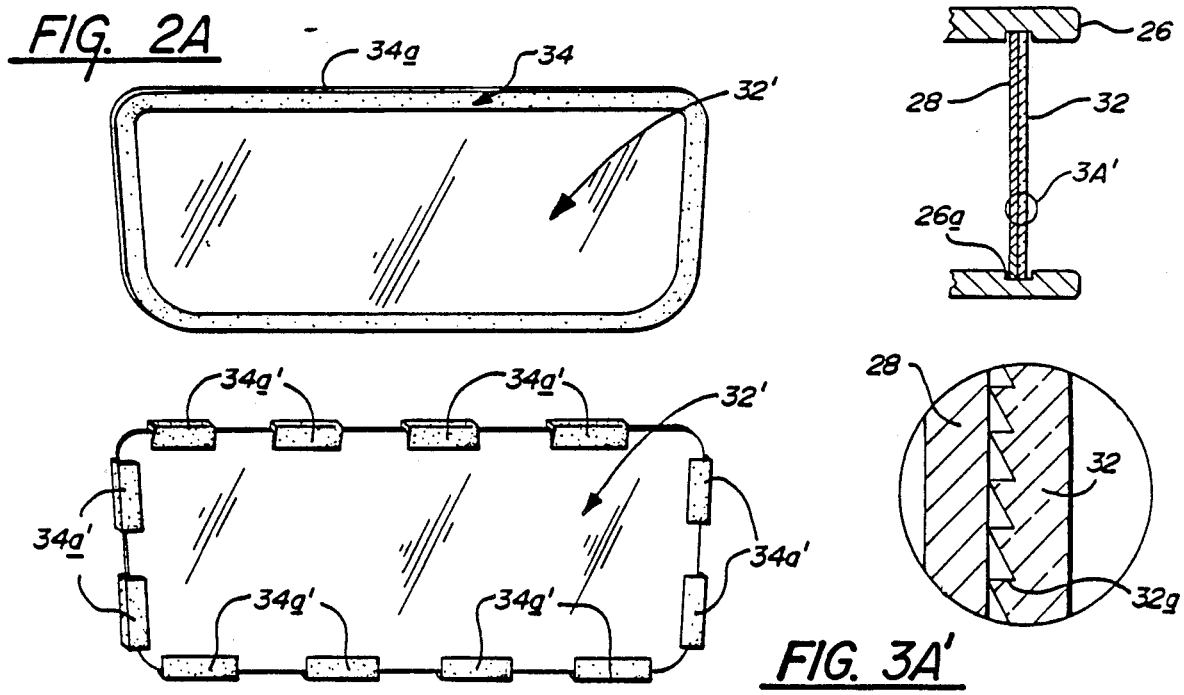
FIG. 2A
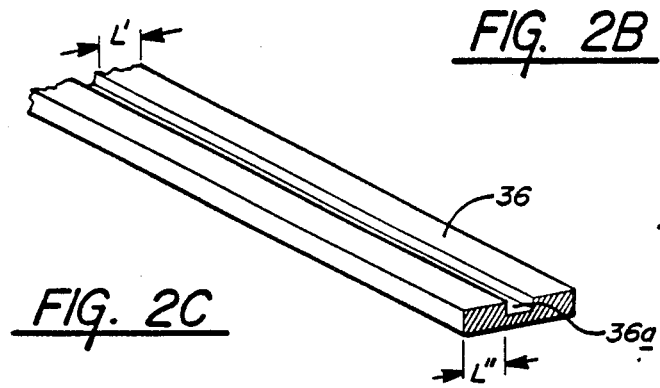
FIG. 2C
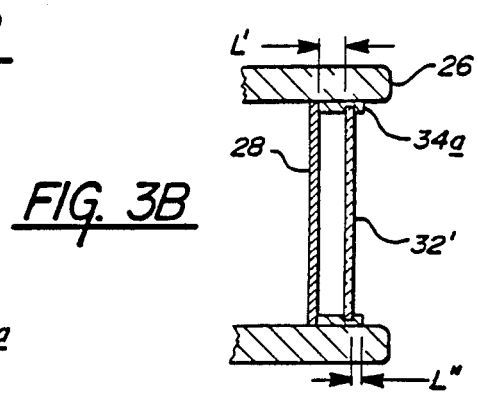
FIG. 3A'
FIG. 2B
FIG. 3B

INSTRUMENT PANEL MAGNIFICATION SYSTEM

FIELD OF THE INVENTION

The instant invention relates generally to large area image magnification systems which employ the principle of Fresnel lens enlargement and more particularly to a large area image magnification system for enlarging the information displayed by the gauge cluster of an automotive instrument panel to the operator thereof.

BACKGROUND OF THE INVENTION

The concept of using an optical system for the purpose of magnifying or resolving an image for the vision impaired has been with mankind since at least as early as the thirteenth century. Indeed, English scholar Roger Bacon, who is generally credited with the invention of spectacles recognized that myopia and hyperopi (nearsightedness and farsightedness, respectively) could be corrected by positioning lenses of varying strength between the eyes of the human observer and the image to be observed.

The strength of a lens is measured in diopters. The diopter of any given lens is obtained by calculating the reciprocal of the focal length of that lens (in meters). For example, if the focal length of a given lens is one meter, the lens has a strength of 1/1 or 1 diopter. Similarly, a lens having a focal length of 50 centimeters or 0.5 meter can be employed to provide a strength 1/0.5 or 2 diopters. As is readily apparent to skilled routineers in the art, the greater the diopter value of a given lens, the more powerful the lens.

As routineers in the art should also appreciate, the human eye includes, inter alia, an optical focusing system. This focusing system has a characteristic focal length defined by the cornea and the lens. The cornea and lens are adapted to cooperate to refract light reflected from a visually detectable image to form a pattern of information upon the eye's retina. The pattern of information formed upon the retina is then transmitted to the brain for recognition. The cornea-lens focusing system of the human eye has a focal length of about 0.016 centimeter which focal length results in a strength of about 60 diopters.

There are instances in which the retina of human being is located farther from the cornea-lens combination than the characteristic focal length thereof. In those instances, images of objects still form at the focal length of the cornea-lens combination; however, that focal length remains well in front of the retina, thus resulting in blurred (out of focus) vision. As the visually detectable object is moved close to the observer, the image is formed farther from (or behind) the focal length of the cornea-lens combination. Eventually the object can be moved sufficiently close to the observer that the image will fall upon the retina and result in the observation of a clear image. This situation describes an individual who is said to be nearsighted. Conversely, if a human being is farsighted, the retina is located at a point in front of the focal length of the cornea-lens combination.

Fortunately, both of these conditions (nearsightedness and farsightedness) can be readily corrected by employing eyeglasses equipped with lenses characterized by powers typically ranging from −15 to +15 diopters. It is to be noted that farsighted individuals require the use of a lens which decreases their inherent focal length; therefore a lens with positive diopters, i.e., a converging lens is employed. Nearsighted individuals require the use of a lens which increases their inherent focal length; therefore a lens with negative diopters is employed.

Unfortunately, advancing age occasionally makes it necessary to apply two different lenses for good vision correction; i.e., one lens for near field vision and one lens for far field vision. Rather than continually switching between two pairs of spectacles, American scholar Benjamin Franklin realized that two different lenses of different diopters, and therefore of different focal lengths could be employed in the same eyeglass frame. These eyeglasses were termed bifocals and generally include an upper lens portion which is adapted to correct for far field vision and a lower lens portion which is adapted to correct for near field vision. Today, such bifocals are routinely produced and in wide use.

Despite the usefulness and success of bifocal eyeglasses, certain objects, such as human readable information displayed by the dials and gauges on a automotive instrument panel may be disposed at a distance from the operator of the automotive vehicle which falls outside of and more particularly between the ranges of the effective correction provided by the upper and lower portions of bifocal lenses. While eyeglasses employing trifocal lenses (i.e., three lenses of different diopters in the same eyeglass frame) may be employed to correct this situation, the fabrication of trifocals lenses is quite costly. Further the us of trifocal lenses may be uncomfortable or disorienting to the user. This becomes especially true if the only time trifocal lens use is required is during the operation of an automotive vehicle.

BRIEF SUMMARY OF THE INVENTION

As an alternative approach to the use of trifocal lenses, the instant inventor conceived the possibility of magnifying the image of an object which would otherwise fall between the range of the bifocal lenses, thereby rendering the image of said object more clearly visible to the observer through the upper lens portion of bifocal eye glasses. However, it is important to note that the magnifying system which is employed cannot be allowed to modify the magnified image in such a way as to deleteriously effect the correcting power of the bifocal lenses. A preferred magnifying means is a Fresnel lens, which, as is well known to those ordinarily skilled in the art, is a lens consisting of a large number of "steps" or "teeth", each step having a convex surface of the same curvature of the corresponding section of a normally shaped convex lens. As will be detailed hereinafter, it is the principle object of the instant invention to operatively dispose a Fresnel lens at an optimized distance from an automotive instrument panel so as to render information displayed thereon easily readable by bifocal lens users, thereby eliminating the need for the use of trifocal lenses.

There is disclosed herein a magnification system for enlarging digital or analog information displayed on an automotive instrument panel. The magnification system comprises an automotive instrument panel which is adapted to display information from a cluster of gauges to the operator of the vehicle. The instrument panel includes a transparent faceplate spacedly disposed relative to the display of information, which panel is bounded by a hood on at least one side thereof. The system further includes a Fresnel lens which is conformable to the shape and size of the transparent faceplate, as well as means for permanently or removably affixing the Fresnel lens adjacent the instrument panel so as to transmit an enlarged version of the displayed information to the remotely positioned operator.

The transparent faceplate may either be substantially planar or substantially nonplanar. The Fresnel lens may be substantially flexible or substantially rigid. In a first embodiment, the affixing means may be adapted to secure the Fresnel lens directly to the transparent faceplate. In this embodiment, it is necessary that the affixing means be substantially transparent, such as a transparent adhesive binder.

It is preferred that the hood completely envelopes the periphery of the instrument panel and that the transparent faceplate is recessed therewithin. In the faceplate enveloping embodiment, the affixing means may include a flange secured to the peripheral surface of the Fresnel lens. The flange may be integrally formed with the Fresnel lens or it may be discretely formed and secured to the periphery of the lens. If it is discretely formed, said flange may be fabricated so as to include an elongated central channel into which the peripheral surface of the Fresnel lens may be seated.

In a preferred embodiment, the flange may be an elongated unitary member which extends about the entire periphery of the Fresnel lens. In an alternatively preferred embodiment, the flange may be formed as a plurality of discrete flange members which are spacedly disposed about the periphery of that Fresnel lens.

Regardless of whether the flange is formed as a unitary or discrete member, it may further include an adhesive for the securement thereof to the hood which surrounds the transparent faceplate. Alternatively, the mechanism by which the flange is affixed to the hood may be selected from the group consisting essentially of double-sided adhesive tape, screw means, Velcro fasteners, and combinations thereof.

The Fresnel lens is cuttable so as to conform to the size and shape of the particular transparent faceplate of any given automotive instrument panel. The affixing means may be adapted to facilitate the removable of the Fresnel lens from the instrument panel (for accommodating multiple drivers) such as by forming the affixing means from Velcro tabs. When Velcro tabs are employed, one tab is preferably placed on the flange, while the complimentary tab is preferably placed on the hood. Finally, it should be noted that the width of the flange may be judiciously selected so as to position the Fresnel lens a preselected distance from the faceplate. In this manner, it is possible to optimize the magnification of displayed information for the eyesight of a particular operator of the vehicle.

BRIEF SUMMARY OF THE DRAWINGS

FIG. 1 is an enlarged perspective view, partially in phantom outline, illustrating a generic automotive instrument panel with the large area Fresnel lens assembly of the instant invention operatively affixed adjacent the transparent faceplate thereof;

FIG. 2A is a perspective view illustrating a first embodiment of the Fresnel lens assembly of the instant invention as configured to conform to the size and shape of the automotive instrument panel depicted in FIG. 1, said first embodiment of the assembly including a single, elongated, unitary flange disposed about the entire peripheral surface of the Fresnel lens;

FIG. 2B is a perspective view illustrating a second embodiment of the Fresnel lens assembly of the instant invention as configured to conform to the size and shape of the automotive instrument panel depicted in FIG. 1, said second embodiment of the assembly including a plurality of, discrete flange members spacedly disposed about the peripheral surface of the Fresnel lens;

FIG. 2C is a perspective, partially sectioned view of a length of the flange material depicted in FIGS. 2A and 2B, said length illustrating a central channel formed therein and into which the Fresnel lens of the instant invention is adapted to be seated;

FIG. 3A is a cross-sectional view taken along line 3A—3A of FIG. 1 and illustrating a first embodiment of the Fresnel lens assembly of the instant invention, said assembly operatively affixed relative to the transparent face plate of an automotive instrument panel; and FIG. 3B is a cross-sectional view, similar to the FIG. 3A embodiment of the instant invention, except this second embodiment of the Fresnel lens assembly illustrates the use of the flange to space the Fresnel lens a given distance from the transparent faceplate of an automotive instrument panel.

DETAILED DESCRIPTION OF THE INVENTION

Referring now to the drawings and particularly to FIG. 1, the Fresnel lens system of the instant invention is illustrated as being operatively affixed to a typical automotive instrument panel of the dashboard of a conventional motor vehicle. This Fresnel lens system, regardless of the manner of attachment to said automotive instrument panel, will be generally referred to by the reference numeral 10. It is to be clearly understood that the instant inventor is not claiming to have been the first to have developed a Fresnel lens, but rather is claiming to have been the first to have developed a novel use for existing Fresnel lens technology. More specifically, the instant inventor has also, as part of his inventive concept, developed a novel mode of affixing that Fresnel lens relative to information displayed by a cluster of gauges disposed on said automotive instrument panel.

The Fresnel lens discussed herein is of conventional design, which design includes a plurality of series of concentric grooves of the usual saw-tooth or concentric truncated convex curve type cross-section 32a (see the detail of FIG. 3A) for refracting incident light toward a common focal point. The cut of an inner concentric groove of the lens will differ from the cut of an outer concentric groove of the lens, in a manner which is well known to the ordinarily skilled artisan, for refracting light toward the common focal point. It is preferred that the surface of the Fresnel lens adjacent the operator is substantially smooth and flat, while the opposite surface is formed with the aforementioned prismatic grooves for providing the magnification effect. Through the use of a clear, durable plastic, such as carbonates, acrylates, methacrylates, acetates, butyrates and polyethylene, and by employing modern molding techniques, it is possible to fabricate a low cost plastic Fresnel lens having optical characteristics which are coordinated to the distance between the plane of the lens and the plane of the cluster of gauges disposed on the instrument panel. In this manner, a properly focused and enlarged image is provided to the operator as viewed through the Fresnel lens. This type of Fresnel lens is commercially available through suppliers such as Edmund Scientific Company of Barrington, N.J.

Returning now to FIG. 1, the automotive instrument panel 12 generally includes an array of gauges adapted to provide the operator thereof with relevant information concerning the operation of the motor vehicle; such gauges including, by way of example, but not limitation, a speedometer 14, a tachometer 16, a fuel gauge 18, a temperature gauge 20, an ammeter 22 and turn signal indicators 24. While the gauges are depicted as generally circularly shaped, any commonly employed design falls within the scope of the instant invention in the same manner that other instrument panel configurations are likewise included within that scope.

In order to prevent, or at least substantially reduce, ambient glare from interfering with the operator's reading of the information displayed on the cluster of gauges 14-24 disposed on the instrument panel 12, a hood 26 is cantilevered outwardly from the plane of the cluster of gauges so as to at least partially (and preferably, completely as indicated by the phantom lines in FIG. 1) envelope or surround that cluster of gauges. Operatively disposed forwardly of (relative to the position of the operator) the gauge cluster, but recessed from the outer edges 26a of the hood 26, is a large area, transparent, substantially rigid, generally rectangularly shaped faceplate 28. Normally, the plane of the transparent faceplate 28 is spaced a small distance (one-quarter to four inches) from the plane of the gauge cluster so as to protect the gauges disposed on the instrument panel from the destructive influence of, or unlawful manipulation by, the operator or passengers of the vehicle.

As can also be seen from a review of FIG. 1, a screw 38 or a pair of complementary Velcro tabs may be employed to affix the Fresnel lens 32 to or adjacent the front face of the transparent faceplate 28. It is to be understood that the means of affixing the Fresnel lens 32 relative to the automotive instrument panel is not so limited, and any other securement techniques well known to those ordinarily skilled in the art may also be employed. Further, although the Fresnel lens 32 is illustrated as being generally coextensive with the surface area occupied by the instrument panel; if the transparent faceplate 28 were fashioned to simply overlay one or more of the gauges, the lens could be similarly configured without departing from the spirit or scope of the instant invention.

It is to be noted that the circular, cross-sectioned area 30 in FIG. 1 represents the location of a steering wheel shaft in a conventional automotive vehicle, the steering wheel having been removed for purposes of this discussion so as not to interfere with the reader's understanding of the placement of the cluster of gauges on the instrument panel In a preferred embodiment, the transparent faceplate 28 will assume a generally planar configuration; however, the faceplate 28 may also assume generally non-planar, or curvilinear attitudes without departing from the spirit or scope of the instant invention. Further, while the faceplate 28 is usually disposed in a plane generally parallel to the plane of the cluster of gauges on the automotive instrument panel, it is possible to locate the faceplate at any angle relative to the cluster of gauges with equal advantage. It should also be noted that the faceplate 28 must be spaced from the cluster of gauges at an angle which is less than the critical angle so that light emanating from the gauges (14-24) can pass through the faceplate for observation by the operator of the vehicle.

Turning now specifically to FIG. 2A, there is illustrated a substantially rigid, generally rectangularly configured, transparent Fresnel lens 32', which lens is substantially similar in size and shape to the size and shape of the transparent faceplate 28 depicted in, and described hereinabove with respect to FIG. 1. However, rather than fabricating the Fresnel lens 32' of FIG. 2A with opposed planar peripheral edges such as the planar edges of Fresnel lens 32, the peripheral edges of this embodiment of the Fresnel lens 32' have, either secured thereto, or formed integrally therewith, one or more flange members generally indicated by reference numeral 34. In the embodiment of FIG. 2A, the flange 34 is fabricated as an elongated unitary member which may be integrally formed of the same synthetic plastic resin as the Fresnel lens itself. Regardless, of the material from which the flange is fabricated note that an adhesive such as a double sided tape or a glue may be deposited upon the exposed exterior surface 34a of the flange 34 for affixing the flange 34 and the Fresnel lens 32 (secured thereto) within the interior of the surrounding hood 26.

In the alternatively preferred embodiment of the lens assembly illustrated in FIG. 2B, the flange 34 of the FIG. 2A embodiment is no longer formed as a single, unitary, elongated member. As opposed thereto, the flange 34 which is secured about the periphery of the Fresnel lens 32' is now fabricated as one or more discrete, relatively short flange members 34a', which flange members are spacedly disposed relative to one another. Of course, the manner of affixing the discrete flange members 34a' to the hood 26 is the same as the manner of affixing the unitary flange 34a thereto (which manner of securement has been described hereinabove).

Referring now to FIG. 2C, there is illustrated a length of flange material 36 from which the discrete flange members 34a' of FIG. 2B or the unitary flange 34a of FIG. 2A may be severed. As depicted, the length of flange material 36 includes a generally centrally located channel 36a, the width of which channel is substantially matched to the thickness of the Fresnel lens 32'. The peripheral edge of the Fresnel lens 32' is to be seated, either by means of a friction fit (occasioned by the close tolerance maintained between the thickness of the Fresnel lens and the width channel) or by an adhesive within the central channel. It is to be noted that, although the channel 36a is illustrated as being centrally located (as will be described in more detail with respect to the embodiment of FIG. 3B), the length 1' of the flange on one side of the channel 36a may be intentionally varied with respect to the length 1" of the flange on the other side of the channel 36a.

FIG. 3A illustrates the embodiment of the Fresnel lens assembly of the instant invention in which the transparent faceplate 28 and the Fresnel lens 32 are positioned in direct contact with one another so that both of said elements are seated within a groove 26a formed in the surrounding hood 26. As depicted in the blow-up associated with FIG. 3A, the saw-tooth side 32a of the Fresnel lens may be placed in direct contact with the front face of the faceplate 28. In an alternate embodiment, the saw-tooth side 32a of the Fresnel lens 32 may be affixed to the faceplate 28 by means of a transparent adhesive. Of course, in this latter embodiment, it is not necessary to position the periphery of the lens within the groove 26a. While this figure depicts the Fresnel lens 32 in direct contact with the faceplate 28, in the embodiment of this invention wherein the lens is formed of a rigid material, the lens becomes self-supporting and actually be operatively positioned in groove 26a without the presence of the faceplate. The elimination of the faceplate could prove attractive to Original Equipment Maufactures.

Finally, now viewing FIG. 3B, there is depicted, as alluded to hereinabove, the embodiment of the Fresnel lens assembly of the instant invention wherein the flange 34a is additionally utilized to space the plane of the Fresnel len 32' from the plane of the faceplate 28 and the plane of the cluster of gauges disposed on the automotive instrument panel 12. In this embodiment, the length 1' is selected to be greater than the length 1'' so that the Fresnel lens is farther removed from the cluster of gauges and the magnification of the displayed information can be increased. It should be apparent that the situation can be reversed so as to have the shorter length 1'' spacing the plane of the Fresnel lens 32' from the plane of the displayed information for decreasing the magnification of the displayed information. In this manner, the optical system can be tailored to the vision of the individual operator.

While there has been illustrated and described several preferred embodiments of the Fresnel lens assembly of the instant invention, it is to be appreciated that many changes and modifications of this invention may be made without departing from the essential spirit thereof. It is the claims that follow hereinafter which define the true scope of this invention.

What is claimed is:

1. A magnifying system for providing individually adjustable magnification of the information displayed on an automotive instrument panel, said system comprising, in combination:

an automotive instrument panel adapted to display visually readable information to an operator; said panel including a transparent faceplate spacedly disposed from the displayed information, and a hood bounding said panel with said transparent faceplate recessed therewithin;

a Fresnel lens substantially conforming to the shape and size of said transparent faceplate, said lens being adjustably spaceable from said faceplate so as to enlarge the displayed information;

spacedly adjustable flange means extending at least partially about the periphery of said Fresnel lens; and a tab for Velcro means on said flange means adapted to removably contact another tab of said Velcro means correspondingly disposed about an interior of said hood for affixing said Fresnel lens thereto, whereby the Fresnel lens can be adjustably spaced a given distance from the transparent faceplate for optimizing the magnification of the displayed information for the particular operator of the vehicle.

2. A magnifying system for enlarging information displayed on an automotive instrument panel to an operator of a vehicle, said system comprising, in combination:

an automotive instrument panel adapted to display visually readable information to the operator; said panel including a transparent faceplate spacedly disposed relative to the displayed information, and hood means at least partially surrounding said faceplate, whereby said faceplate is recessed therewithin;

a Fresnel lens substantially conforming to the shape and size of the transparent faceplate;

affixing means at least spacedly disposed about the periphery of the Fresnel lens; corresponding affixing means correspondingly disposed about an interior of said hood means for removably connecting said Fresnel lens adjacent said instrument panel; said corresponding affixing means further providing for adjustably connecting said Fresnel lens forwardly of said faceplate so as to optimize the magnification of the displayed information for the operator of the vehicle.

3. A system as in claim 2, wherein the transparent faceplate is substantially planar.

4. A system as in claim 2, wherein said Fresnel lens is substantially flexible.

5. A system as in claim 2, wherein said corresponding affixing means is adapted to secure said Fresnel lens in direct contact with said transparent faceplate.

6. A system as in claim 2, wherein said corresponding affixing means is adapted to secure said Fresnel lens in spaced relation to said transparent faceplate.

7. A system as in claim 2, further including flange means integrally formed with said Fresnel lens.

8. A system as in claim 7, wherein said flange means is discretely formed relative to said Fresnel lens; said discrete flange means including channel means into which the peripheral surface of said Fresnel lens may be seated.

9. A system as in claim 2, wherein said corresponding affixing means and said affixing means include means selected from the group consisting essentially of double-sided adhesive tape, Velcro tab means, screw means, and combinations thereof, for securing said Fresnel lens to said hood means.

10. A system as in claim 2, wherein said Fresnel lens is cuttable to conform to the size and shape of said transparent faceplate.

* * * * *